James C. Earthman  Inventor
By James A. Reilly  Attorney

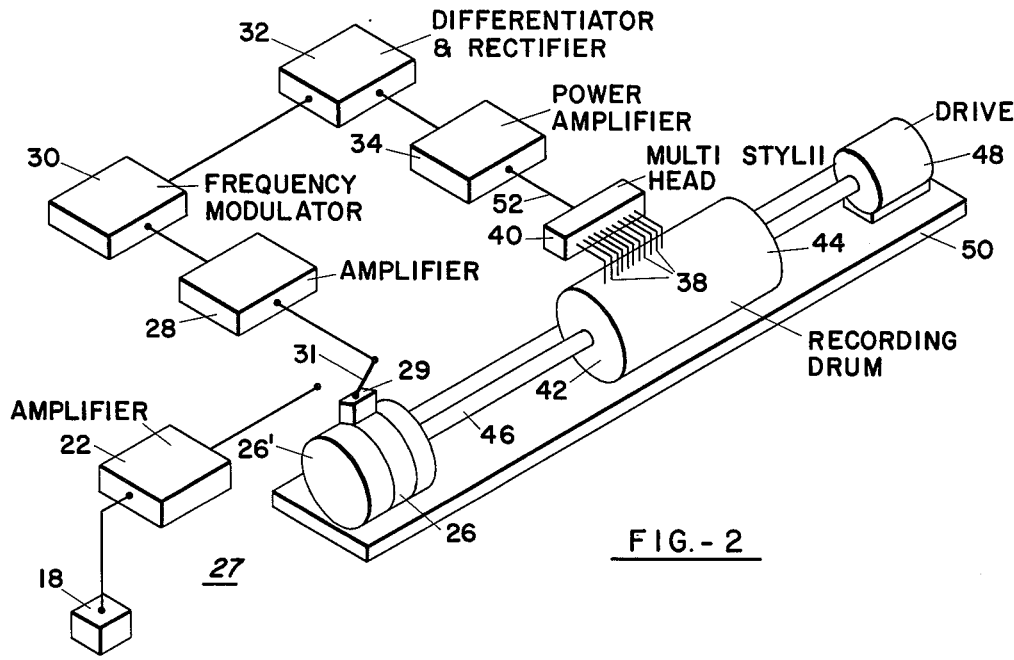
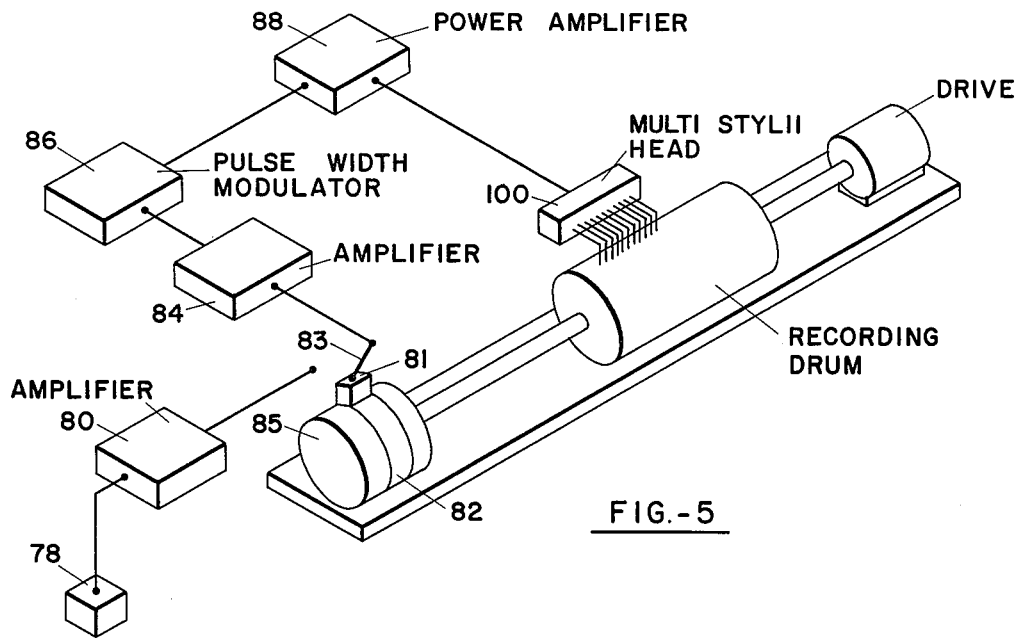

Nov. 2, 1965   J. C. EARTHMAN   3,216,020
METHOD AND SYSTEM FOR PRESENTING SEISMIC DATA
Filed Sept. 23, 1957   3 Sheets-Sheet 3
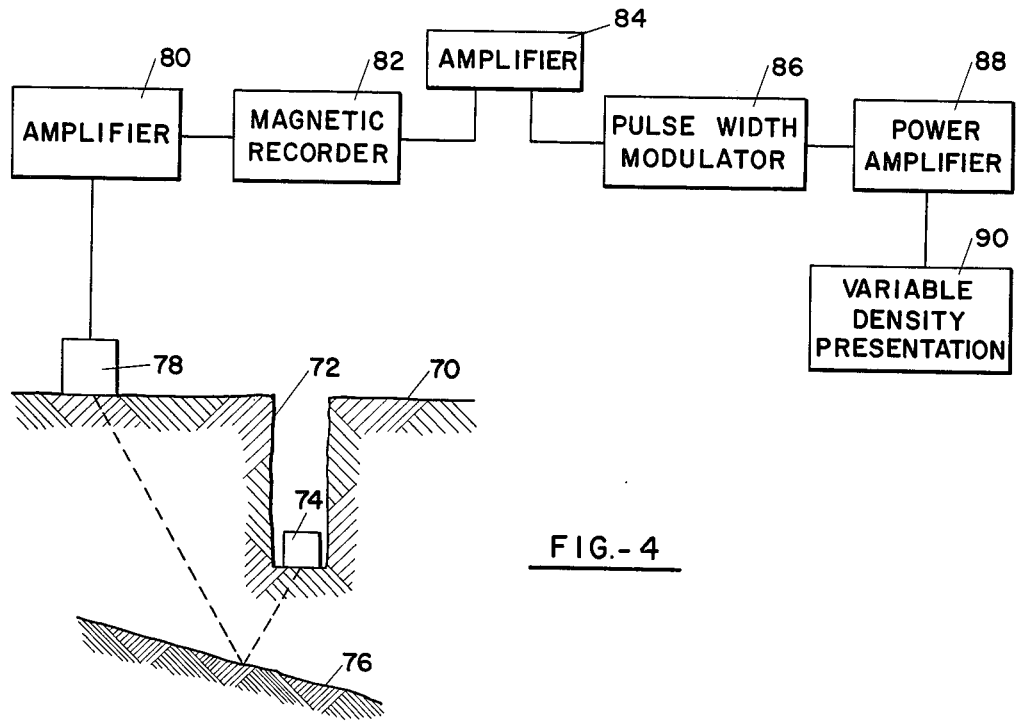
FIG.-4
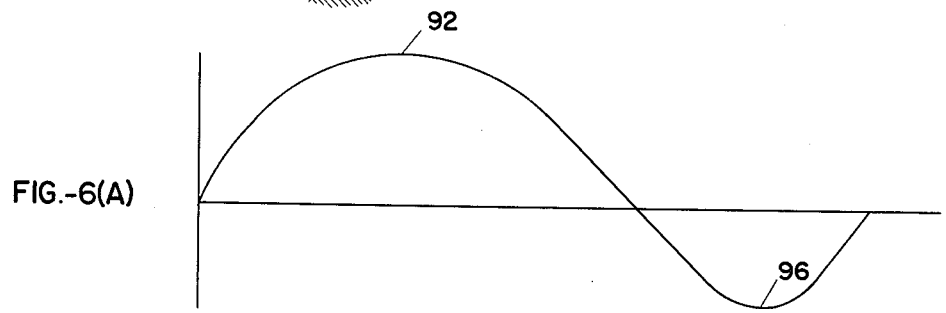
FIG.-6(A)
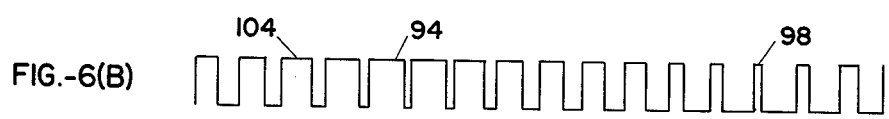
FIG.-6(B)
FIG.-6(C)
FIG.-6
James C. Earthman   Inventor
By James A. Reilly  Attorney

United States Patent Office 3,216,020
Patented Nov. 2, 1965

3,216,020
METHOD AND SYSTEM FOR PRESENTING SEISMIC DATA
James C. Earthman, Tulsa, Okla., assignor, by mesne assignments, to Jersey Production Research Company
Filed Sept. 23, 1957, Ser. No. 685,527
4 Claims. (Cl. 346—74)

This invention relates to a method and system for presenting seismic data. It relates more particularly to a new and useful method and system for presenting seismic data recorded in a form of a variable density nature which enables a computer to more readily recognize subsurface reflections.

In prospecting for valuable minerals such as oil, one method utilized is the seismic reflection technique. A seismic disturbance is initiated at a selected point in the surface of the earth and the seismic waves are detected at a plurality of points spread out in a pre-determined pattern. The detected waves are picked up with sensitive detectors known as geophones which translate the detected motion or waves into electric impulses or seismic signals which are recorded on a seismograph. The generated electric signal, in amplitude and frequency, is similar to the amplitude and frequency of the detected seismic waves which are substantially sine waves having many freqencies and varying amplitudes. A magnetic recorder is quite often used upon which to make the record. The signal which can be reproduced from the recorder may also be referred to as the seismic signal. The record may be provided by any well-known means with suitable timing indications so that when the seismograph or seismogram is later examined it is possible to determine the length of time required for the arrival of seismic waves at any particular point on the earth's surface either directly from the source or reflected from the underlying strata. From other data obtained in the area being studied, such as seismic wave velocity in the various earth layers, it is then possible to estimate the depth of the various reflecting substrata.

In other words, the record so obtained must be analyzed for the purpose of determining reflecting subsurface boundaries prior to locating structure which is likely to contain oil deposits. The conventional records are very difficult to analyze and require exceptionally skilled computers. Recently, seismic prospectors have become interested in improving the manner in presenting the seismic data obtained from seismic prospecting. Consequently, various methods have been developed which present the data in a different form from that conventionally presented so as to enable the computers to more easily and accurately ascertain the location of subsurface boundaries.

The present invention is directed to a new and different method of presenting seismic information which method consists of recording secondary electrical signals or carrier signals which are, in modulation, proportional to the amplitudes of the primary electrical signal or seismic signal generated by the detecting geophones. A record is obtained which contains recorded electric signals that not only represent the original pirmary signal generated by the geophone, but also gives visible variable density forms which are indicative of the relative amplitudes of the detected seismic signals but are much more easily seen. The secondary electrical signals are recorded directly on electric writing paper in a variable density facsimile without resorting to photographic processes. The resulting record when correlated with other records produced in the same manner, gives a clear visible indication of possible underground strata.

The nature, objects, and a fuller understanding of the invention may be had by referring to the following descriptions and claims taken in conjunction with the accompanied drawings in which:

FIG. 2 is an isometric schematic representation of the embodiment of the invention as illustrated in FIG. 1;

FIG. 4 is a block diagram illustrating a second system which might be utilized in practicing the invention;

FIG. 5 is an isometric schematic representation of the embodiment of the invention as illustrated in FIG. 4; and FIG. 6 is a graphical representation illustrating a seismic signal, FIG. 6(A), and a second form of variable density presentation, FIG. 6(C), with an intermediate curve illustrated, FIG. 6(B).

Figure 1:
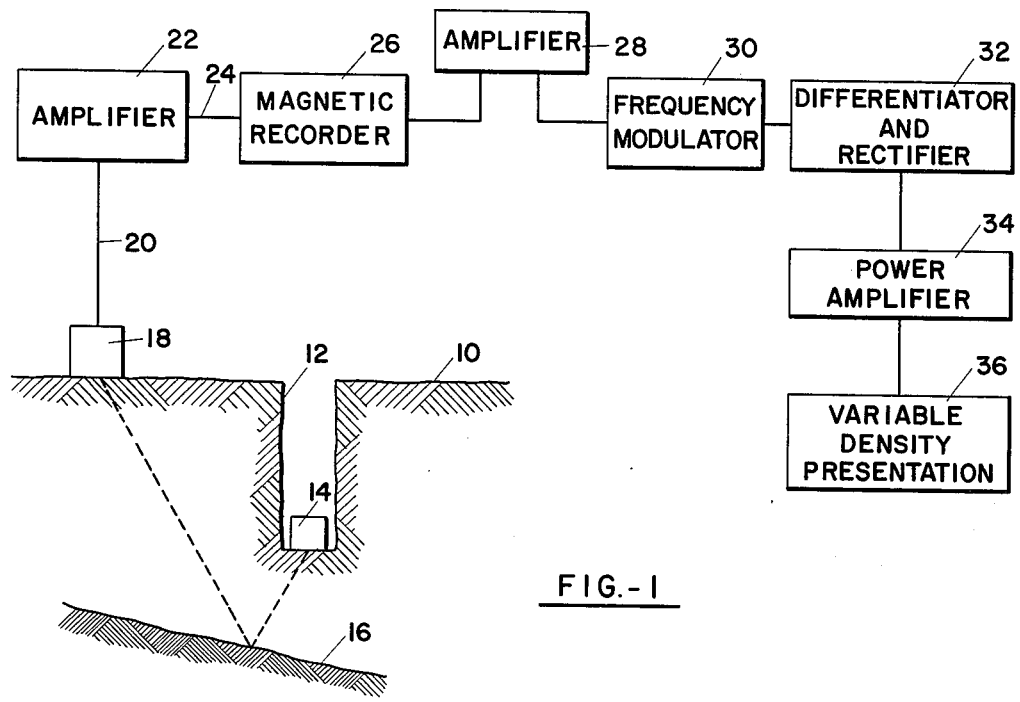
FIG. 1 is a block diagram of one type of system which may be utilized in practicing the new method.

Referring to the drawing and more particularly to FIG. 1, numeral 10 represents the surface of the earth into which has been drilled a borehole 12. An explosive charge 14, such as dynamite, is placed in borehole 12. The explosion is detonated creating seismic waves which are propagated through the subsurface and impinges upon an interface between formations or subsurface strata of different elastic properties with the interface herein being indicated at 16. The seismic waves are reflected from interface 16 and are propagated through the earth and detected by a geophone 18 which is utilized to generate an electric signal having a frequency and amplitude, similar to and representative of, the frequencies and amplitudes of the detected seismic waves. The signals which are substantially sinusoidal in form are conducted by conductor 20 to amplifier 22. Conductor 24 transmits the amplified signal through magnetic head 29 to a magnetic recording medium 26 placed upon drum 26' where a permanent record is made of the primary electrical signal which is indicated above as being similar to the seismic wave. The manner and method of producing the primary signal as a magnetic trace upon a magnetic recording medium is well-known to those skilled in the art. It is also possible to conduct the seismic signal directly from the geophone 18 to amplifier 28 if desired.

The electrical signal produced by playing back the record on the magnetic recording medium 26 is transmitted to amplifier 28. By use of switch 31 head 29 may be utilized for reproducing the signal to be fed to amplifier 28. Other recording and reproducing means may of course be utilized. The record may be corrected if desired for difference in elevation of the geophones, the distance of the geophone from the seismic disturbance, the velocity of the seismic wave and other corrections as desired before the seismic signal is reproduced in the system. The voltage or power of the primary signal is increased or amplified by amplifier 28 and is then fed into frequency modulator 30. The wave which is fed into frequency modulator 30 is substantially sinusoidal in form and varies in amplitude and frequency. The signal which leaves frequency modulator 30 is of constant amplitude and varies in frequency directly as the variation in amplitude of the input signal. It will be noted that the output wave is substantially a square wave or substantially rectangular in shape and is illustrated in FIG. 3(B). A signal from frequency modulator 30 is then conducted to differentiator and rectifier means 32 which produces an output voltage proportional to the rate of change of the magnitude of the input signal. It is a pulse repetition of such input signal. The peaks or spikes representing the pulses are very sharp in nature and have the negative portion of the wave clipped or eliminated by the rectifier incorporated within 32. The signal at this point is illustrated in FIG. 3(C). The pulses from differentiator and rectifier 32 are then fed to power amplifier 34 with the output signal of the power amplifier 34 being greatly increased and with the number of pulses being directly proportional to magnitude of the input seismic signal. The pulses from power amplifier 34 energize the writing stylii which record on moving electric writing paper pulses that vary in spacing depending on the output of the frequency modulator whose output is in turn controlled by the primary electric signal which was generated by the geophones upon detecting the seismic wave reflection. It is therefore apparent that the variable density presentation, which is illustrated in FIG. 3(D), is a function of the original seismic wave.

The stylii 38 are shown in FIG. 2 and are supported by an actuator box 40 affixed to chassis 50 adjacent the outer surface of drum 42. The electric writing paper, such as Teledeltos or Timefax paper, may be used and is placed upon the surface of the drum. The contact points of stylii are urged against the surface of the paper 44 and are positioned in a side by side relationship and their contact with the paper is in a line perpendicular to the movement of the paper. It will be noted that there should be a large number of very closely spaced stylii and they should be capable of producing a very fine and distinct dot or mark upon the writing paper. The stylii are actuated or energized by voltage charges from the power amplifier. Both drum 42 and drum 26′ for magnetic recording medium 26 may be driven by common shaft 46 having as its primary motivator an electric motor within motor housing 48. Motor housing 48, drum 44, activator box 40, and the magnetic recording and playback device 26 may be supported on a common chassis 50. The power amplifier 34 is connected to the stylii activator through the electric conductor 52.

The operation of the apparatus shown in FIG. 2 will be explained with reference to the wave form representation of FIG. 3 wherein the abscissa represents time and the ordinate the electrical signal output. It will be assumed that the "wiggly trace" depicted in FIG. 3(A) is representative of the primary electric signal output of the magnetic recorder and playback device 27. It is the signal which is fed through the amplifier 28 to the frequency modulator 30. The wave illustrated in FIG. 3(B) is typical of the output signal from frequency modulator 30. It will be observed that the signal varies in frequency directly as the variation in amplitude. The signal, as represented by FIG. 3(B), is fed into differentiator and rectifier 32. The differentiator produces an output voltage proportional to the rate of change of the input voltage of the rectifier. The rectifier portion of device 32 clips the negative portion of the signal of FIG. 3(B) with a resulting signal similar to the one illustrated in FIG. 3(C). For each pulse that is fed into the power amplifier the stylii is actuated, thus making a series of channelized or perpendicular rows of dots as indicated in FIG. 3(D). The frequency modulator is adjusted so that with zero input voltage, its frequency produces a dot repetition rate that gives a medium gray appearance on the electric writing paper. The frequency modulator 30 is so designed that its frequency increases on an increase in voltage input and decreases on decreases in amplitude thus producing dots spaced close together on the peaks as 54 of the seismic signals and dots spaced far apart on the valley represented by 56 of the seismic signal. In this manner, as shown in FIG. 3(D) the variable density effect is obtained. It will be seen that for peak 54 the frequencies of the square waves signal in 3(B) is rather high as indicated at 58 and as the seismic signal approaches zero, the frequency in FIG. 3(B) decreases accordingly and decreases to an even smaller frequency at 60 as the valley 56 is reached. The pulses in FIG. 3(C) are also seen to increase at 62 which is directly below the peak 54 and decreases at 64 which is directly below the valley 56. In the variable density trace FIG. 3(D) the area is the darkest at 66 which is directly below peak 54 and it is the lightest at 68 directly below valley 56. From the above, it is quite evident that the darker section is indicative of the peaks and the lighter section is indicative of the valleys and with the contrast obtained, it is very easily distinguished. It is to be understood that the speed of writing paper must be considered in connection with the design of the frequency modulator for obtaining the desired wave representation and variation in density presentation. Although only one trace has been reproduced in the example given in the variable density presentation, it is to be understood that signals from other geophones may be presented in a variable density form in a side by side or channelized relation with the variable density presentation shown herein. The use of side by side presentation is a direct method of presenting seismic data in a scale section form.

FIG. 4 represents a different embodiment of the present invention and will be considered in relation with FIGS. 5 and 6. Numeral 70 represents the surface of the earth into which borehole 72 has been drilled and in which has been placed an explosive charge 74 or other means of creating a seismic wave. The seismic waves generated by the explosive 74 propagate through the earth and impinge upon the interface 76 between two underground formations of different elastic properties. The seismic waves are reflected from interface 76 and are detected by a geophone 78 which generates an electric signal having an amplitude and frequency similar to that of the detected seismic wave. The primary electrical signal or waves which are substantially sinusoidal in form are conducted to amplifier 80 and then recorded by a magnetic head 81 on recording medium 82 carried on drum 85. When magnetic head 81 is utilized to reproduce the signal, switch 83 is connected with the lead to amplifier 84. The signal from the magnetic recorder which is a reproduction of the primary electrical signal is amplified by amplifier 84 and fed into pulse-width modulator 86 which produces a substantially square wave with the pulse width varying according to the amplitude of the signal. The square waves are then amplified by power amplifier 88 and serve to activate recording stylii of variable density presentation 90.

Figure 3:
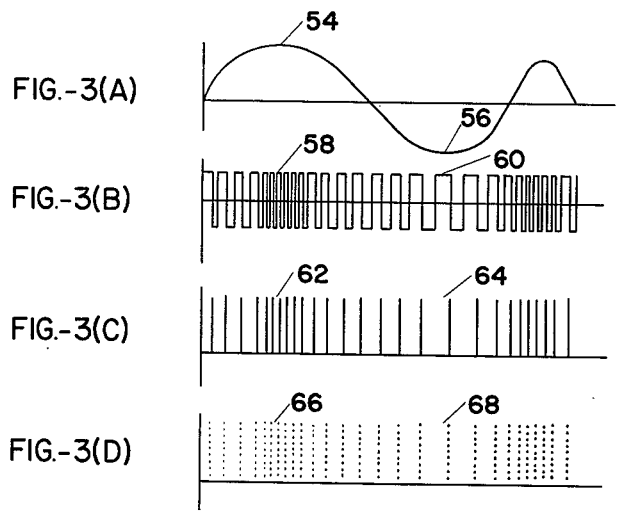
FIG. 3 is a graphic representation illustrating a comparison between the primary electric signal, FIG. 3(A), of the original seismic wave; intermediate waves or records, FIG. 3(B) and FIG. 3(C); and the variable density presentation, FIG. 3(D)

The operation of the embodiment as illustrated in the block diagram of FIG. 3 can more clearly be shown in conjunction with FIG. 5 and FIG. 6. The peaks 92 of the amplified wiggly trace or primary electrical signal, illustrated in FIG. 6(A), are converted by the pulse-width modulator 86 into wide pulses. The peaks 92 of the FIG. 6(A) of the original wiggly trace signal are converted into wide pulses, as shown at 94 and the valleys 96 are converted into narrow pulses, as shown at 98. The pulse-width is a fixed pulse width at zero amplitude and increases in width as the amplitude increases in a positive direction and decreases proportionately below the fixed width as the amplitude becomes negative. The pulses as illustrated in FIG. 6(B) are then fed into power amplifier 88 which actuates stylii actuator 100. The stylii are energized for the width of each pulse and it will be seen that the wider the pulse, the wider will be the line. Each stylus will record a mark such as 102 which is the same length or duration as its actuating pulse 104. The stylii are placed very close together and it can be seen that the peaks of seismic signals will give a series of wide parallel marks which give a visual appearance as seen at 106 as being nearly a solid black or at least a very dark area. It is likewise seen that the valleys 108 will give an appearance of a very light area. It is readily seen that a variable density presentation is given which the interpreter can more easily utilize in determining the presence of underground structure.

It is thus seen that this is an improved method of presenting seismic data to give a facsimile of a variable density presentation. In summary, the improvement comprises generating a carrier or secondary electrical signal and recording the carrier signal as a plurality of side by side traces on an electrosensitive medium with each trace comprising a plurality of individual recordations bearing a common visual characteristic. The carrier signal is modulated by the seismic signal so as to simultaneously modulate the characteristics of the recordations in each record trace. In one mode of carrying out this invention the carrier signal may be recorded as a series of dots spaced in a row perpendicular to the travel of the recording medium with the spacing between the rows being determined by the speed of the recording medium and the frequency modulation of the carrier signal with such frequency being proportional to the amplitude of the seismic signal. The carrier signal may also be recorded as a series of spaced sections or blocks of closely spaced parallel lines wherein the carrier signal is modulated such that its pulse width is proportional to the amplitude of the seismic signal. In any event, the traces appear visually to vary in their shading in response to the magnitude of the signal recorded; expressed otherwise, the traces present a variable density appearance resembling to a great extent the photographic variable density presentation which is described at length in the Rieber patent, U.S. 2,051,153.

It is, of course, understood that this invention be not limited to the specific embodiments described herein in that numerous changes in the methods and details of construction and the combination and arrangement of parts may be resorted to without departing from the spirit and scope of the invention which is to be limited only by the sub-joint claims.

The invention claimed is:

1. A recorder for visual variable density presentation of a seismic signal which comprises in combination: an electrosensitive recording medium; a linear bank of styli contacting said recording medium; means to move said recording medium normal to said bank of styli; energizing means to energize simultaneously all the styli, each such energization to be of equal magnitude for each of the styli; and means to control the ratio of the energization to non-energization in any unit length of the recording medium as a function of the seismic signal for its corresponding unit length.

2. A recorder for visual variable density presentation of a seismic signal which comprises in combination: an electrosensitive recording medium; a linear bank of styli contacting said recording medium; means to move said recording medium normal to said bank of styli; means to periodically energize all the styli simultaneously, each such energization to be of equal magnitude for each of the styli; and means to control the duration of each periodic energization.

3. A recorder for recording in visual variable density form a seismic signal which comprises in combination: an electrosensitive recording medium; a linear bank of styli contacting said recording medium; means to move said recording medium normal with respect to said bank of styli; means for simultaneously equally energizing repeatedly said bank of styli as a function of said seismic signal, each such energization to be of equal magnitude, and control means to control the occurrence of each energization as a function of the amplitude of the seismic signal.

4. A recorder for recording on electrosensitive medium in visual variable density form a seismic signal which comprises in combination: a plurality of styli in a linear bank contacting said recording medium; means for moving said medium past said plurality of styli in a direction normal to the linear bank; means to momentarily simultaneously energize all said styli in such a manner as to produce a dot on said recording medium for each styli; and means to control the occurrence of each energization as a function of the seismic signal.

References Cited by the Examiner
UNITED STATES PATENTS

| | | | |
|---|---|---|---|
| 2,051,153 | 8/36 | Rieber | 340—15 |
| 2,066,880 | 1/37 | Eissfeldt | 346—66 |
| 2,403,983 | 7/46 | Koenig | 346—74 |
| 2,501,791 | 3/50 | Silverman | 340—15 X |
| 2,620,890 | 12/52 | Lee | 340—15 X |
| 2,659,650 | 11/53 | MacDonald | 346—74 |
| 2,726,131 | 12/55 | Skelton | 340—15 |
| 2,739,865 | 3/56 | Willey | 346—74 |
| 2,757,357 | 7/56 | Peterson | 340—15 |
| 2,779,654 | 1/57 | Williamson | 346—74 |
| 2,791,288 | 5/57 | Meier | 340—15 X |
| 2,803,515 | 8/57 | Begun | 340—15 X |
| 2,877,080 | 3/59 | Eisler | 340—15 |
| 2,907,621 | 10/59 | Eisler | 340—15 X |
| 2,928,708 | 3/60 | Ellison | 340—15 X |
| 2,932,547 | 4/60 | Swan | 340—15 |
| 2,967,291 | 1/61 | Carlisle et al. | 340—15 |
| 2,991,446 | 7/61 | Loper | 340—15 |
| 3,006,713 | 10/61 | Klein et al. | 340—15.5 X |
| 3,063,053 | 11/62 | Blake et al. | 340—15.5 X |

IRVING L. SRAGOW, *Primary Examiner.*

EVERETT R. REYNOLDS, ELI J. SAX, *Examiners.*